United States Patent [19]
Winters

[11] 3,833,459
[45] Sept. 3, 1974

[54] FELT BACKING FOR VINYL FLOOR COVERING HAVING A BINDER COMPRISED OF SYNTHETIC RUBBER LATEX AND A REACTIVE THERMOSET RESIN

[75] Inventor: Donald C. Winters, Plainfield, N.J.

[73] Assignee: Congoleum-Industries, Inc., Kearny, N.J.

[22] Filed: Oct. 29, 1971

[21] Appl. No.: 194,033

Related U.S. Application Data

[62] Division of Ser. No. 13,154, Feb. 20, 1970, abandoned.

[52] U.S. Cl.................. 162/155, 162/166, 162/169, 162/172
[51] Int. Cl............................................. D21h 5/18
[58] Field of Search ............ 162/166, 155, 172, 169

[56] References Cited
UNITED STATES PATENTS

| | | | |
|---|---|---|---|
| 2,563,897 | 8/1951 | Wilson | 162/166 |
| 2,868,641 | 1/1959 | Feigley | 162/155 |
| 2,905,584 | 9/1959 | Dunlap | 162/166 X |
| 3,093,609 | 6/1963 | Feigley et al. | 162/155 X |
| 3,141,814 | 7/1964 | Schultz | 162/155 |
| 3,184,373 | 5/1965 | Arledter | 162/155 X |
| 3,264,171 | 8/1966 | Gleason | 162/155 X |
| 3,269,889 | 8/1966 | Hutchins | 162/155 |
| 3,270,671 | 9/1966 | Daupenspeck et al. | 162/155 X |
| 3,365,358 | 1/1968 | Hutchins | 162/155 |
| 3,556,930 | 1/1971 | Scarvelis | 162/135 |

FOREIGN PATENTS OR APPLICATIONS

| | | | |
|---|---|---|---|
| 263,409 | 8/1967 | U.S.S.R. | 162/166 |

Primary Examiner—S. Leon Bashore
Assistant Examiner—William F. Smith
Attorney, Agent, or Firm—Richard T. Laughlin

[57] ABSTRACT

An vinyl floor covering having a felt backing sheet made of cellulosic or chrysotile asbestos fibers saturated with a binder comprising 36–74% synthetic rubber latex and 17–60% reactive resin of the melamine or urea formaldehyde type to which is laminated a vinyl wear layer.

2 Claims, No Drawings

FELT BACKING FOR VINYL FLOOR COVERING HAVING A BINDER COMPRISED OF SYNTHETIC RUBBER LATEX AND A REACTIVE THERMOSET RESIN

This is a Division of application Ser. No. 13,154, filed Feb. 20, 1970, now abandoned.

This invention relates to a method of producing an improved vinyl floor covering, and more particularly, this invention relates to an improved felt backing sheet to which a vinyl wear layer is laminated.

Vinyl products have become increasingly more popular and common as surface coverings for walls, floors, and the like. The usual covering material comprises a backing sheet of cellulosic or asbestos fibers which are impregnated with a binder such as a synthetic rubber latex. A vinyl wear layer produced by the usual method such as extrusion or casting is laminated to the backing sheet with heat and pressure.

One of the problems encountered in producing a product of this type is that during the processing, when the resinous wear layer is laminated to the asbestos sheet, the backing sheet tends to soften or stretch, particularly under the influence of heat. Although the reason for this softening is not completely understood, it is believed to be due to the migration of the plasticizer from the resinous wear layer into the felt. This softening of the backing layer tends to reduce the quality of the finished product, as the softened backing layer will not be a sufficiently rigid support for the wear layer.

Therefore, a primary object of this invention is to provide surface covering which overcomes the above difficulties of the prior art surface coverings.

A further object of this invention is to provide a surface covering having an improved backing sheet.

Still another object to this invention is to provide a surface covering having a backing sheet which does not soften under processing conditions.

A further object of this invention is to provide an improved surface covering having a backing sheet which does not need a coagulating agent for kicking the resin out of the emulsion onto the fibrous mat.

Still another object of this invention is to provide a method for manufacturing a durable sheet vinyl product.

Yet another object of this invention is to provide a method for producing an improved vinyl surface covering.

Another object of this invention is to provide a method for producing a vinyl surface covering including an improved backing layer for the vinyl wear layer.

DESCRIPTION OF THE INVENTION

It has now been found that the backing sheet used in surface coverings may be improved by the addition of a reactive resin of the melamine or urea formaldehyde type. The fibrous backing sheet is usually formed from a fiber slurry which is layed out onto a wire for forming and drying the fibers into a felt sheet. The latex binder is added while the fibers are in the slurry.

In the preferred embodiment, the reactive resin is mixed with the latex binder, and the resin and latex are added together to the slurry prior to forming the fibers into a felt sheet. Although it is not necessary to use a plasticizer with the reactive resin, a plasticizer may be used, and would also be added to the latex resin mixture which is to be added to the slurry.

The melamine or urea formaldehyde type of reactive resin is added to the slurry in proportions of about two to about twenty percent by weight of the slurry.

Among the reactive resin which could be used and which have been found suitable in the practice of this invention are: hexamethoxymethylmelamine; 1-hydroxymethyl-3,5-dimethoxymethyl melamine; N,N'-dimethylol urea; dihydroxymethylolethylene urea; N,N'-bis(methoxymethyl)urea; N,N'-dimethylolpropylene urea; 5,5-dimethyl-N,N'-dimethylol propylene urea; N,N'-dimethylolethylene urea; N,N'-dimethylol ethylene urea and methylated methylolmelamine.

After the binder and the resin have been added to the fibrous slurry, the slurry is treated in the usual manner so as to form a felted sheet. The felt is then heated to cure the resin, and in the product that is produced, the reactive resins prevent the felt from stretching under the processing conditions. When the felt is formed in this manner, it may be laminated with a vinyl or other resinous layer under conditions of heat and pressure, and the backing sheet will not soften as does the backing sheet of prior art surface coverings.

In the practice of this invention, the asbestos fibers are slurried with water at about 3 to 7% consistency. The slurry is then pumped into continuous precipitation equipment where the latex-reactive resin mixture is added. An even deposition of the latex-reactive resin mixture on the fibers occurs. The precipitated slurry is then formed into sheets, dried, and cured at approximately 390° F for about 2 minutes.

The following non-limiting examples are typical of slurry compositions used in this invention:

| Example I | Parts | % Binder—Dry |
|---|---|---|
| Asbestos fibers, crysotile | 210 | |
| Dow Latex[1] (48% solids by weight) | 71 | 34.9% |
| GAF Latex[2] (50% solids) | 20 | 9.9 |
| Microcrystalline Wax (50% solids) | 11 | 5.5 |
| Methylated Methylol Melamine Resin (65% solids) | 77 | 49.7 |
| | | 100.0 |

Asbestos slurried at 3% consistency.

| Example II | Parts | % Binder—Dry |
|---|---|---|
| Asbestos fibers, crysotile | 210 | |
| Dow Latex[1] (48% solids by weight) | 71 | 34.9% |
| GAF Latex[2] (50% solids) | 20 | 9.9 |
| Microcrystalline Wax (50% solids) | 11 | 5.5 |
| Hexamethyoxymethylmelamine (98% solids) | 51 | 49.7 |
| | | 100.0 |

Asbestos slurried at 3% consistency.

| Example III | Parts | % Binder—Dry |
|---|---|---|
| Asbestos fibers, crysotile | 210 | |
| Dow Latex[1] (48% solids by weight) | 71 | 34.8% |
| GAF Latex[2] (50% solids) | 20 | 9.9 |
| Microcrystalline Wax (50% solids) | 11 | 5.5 |
| UF Resin[3] (55% solids) | 18.3 | 10.1 |
| Methylated Methylol Melamine (65% solids) | 61.6 | 39.7 |
| | | 100.0 |

Asbestos slurried at 3% consistency.

[1] Butadiene-styrene
[2] Butadiene-styrene
[3] Urea formaldehyde

| Example IV | Parts | % Binder—Dry |
|---|---|---|
| Asbestos fibers, crysotile | 210 | |
| Dow Latex¹ (48% solids by weight) | 71 | 46.3% |
| GAF Latex² (50% solids) | 20 | 13.2 |
| Microcrystalline Wax (50% solids) | 11 | 7.3 |
| Methylated Methylol Melamine Resin (65% solids) | 38.5 | 33.2 |
| | | 100.0 |

Asbestos slurried at 3% consistency.

| Example V | | |
|---|---|---|
| Asbestos fibers, crysotile | 210 | |
| Dow Latex¹ (48% solids by weight) | 71 | 57.5% |
| GAF Latex² (50% solids) | 20 | 16.4 |
| Microcrystalline Wax (50% solids) | 11 | 9.0 |
| UF Resin³ (55% solids) | 19.1 | 17.1 |
| | | 100.0 |

Asbestos slurried at 3% consistency.

| Example VI | | |
|---|---|---|
| Asbestos fibers, crysotile | 210 | |
| Dow Latex¹ (48% solids by weight) | 71 | 28.0 |
| GAF Latex² (50% solids) | 20 | 8.0 |
| Microcrystalline Wax (50% solids) | 11 | 4.4 |
| Methylated Methylol Melamine (65% solids) | 115.5 | 59.6 |
| | | 100.0 |

Asbestos slurried at 3% consistency.

¹Butadiene-styrene
²Butadiene-styrene
³Urea formaldehyde

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A method of producing a fibrous backing sheet for surface coverings consisting of:
    a. forming a slurry of crysotile asbestos fibers in water at about 3 to 7% consistency,
    b. introducing said slurry into a reaction vessel,
    c. adding about 12–32% on a dry solids basis of a strengthening binder to said slurry in said reaction vessel,
    d. said binder comprising:
        1. about 36–74% of a styrene-butadiene latex,
        2. about 17–60% of a reactive resin selected from the group consisting of hexamethoxymethylmelamine; 1-hydroxymethyl-3,5-dimethoxymethylmelamine; N,N'-dimethylol urea; dihydroxymethylolethylene urea; N,N-bis(methoxymethyl) urea; N,N'-dimethylolpropylene urea; 5,5-dimethyl-N,N'-dimethylolpropylene urea, and methylated methylol melamine; and
        3. about 4–9% of microcrystalline wax;
    e. mixing said slurry and said binder together in said reaction vessel,
    f. introducing the slurry-binder mixture into precipitation equipment for even, simultaneous deposition of the binder components onto said fibers,
    g. forming a fibrous sheet from said slurry, and
    h. drying and curing said sheet at an elevated temperature.

2. A fibrous backing sheet useful in lamination with plasticized resinous layers and having good resistance to the softening effects of plasticizers in contact therewith, consisting essentially of:
    a. a felted fibrous component of chrysotile asbestos fibers,
    b. about 12–32% of a strengthening binder for said felted fibrous component,
    c. said binder being deposited on said asbestos fibers in the felt making slurry and comprising:
        1. about 36–74% of a styrene-butadiene latex,
        2. about 17–60% of a reactive resin selected from the group consisting of hexamethoxymethylmelamine; 1-hydroxymethyl-3,5-dimethyoxymethylmelamine; N,N'dimethylol urea; dihydroxymethylolethylene urea; N,N'-bis(methoxymethyl)urea; N,N'-dimethylolpropylene urea; 5,5-dimethyl-N,N'-dimethylolpropylene urea; and methylated methylolmelamine, and
        3. about 4–9% of microcrystalline wax.

* * * * *